Patented Feb. 21, 1933

1,898,515

UNITED STATES PATENT OFFICE

ANDREW ALBRIGHT, 3D, OF MAPLEWOOD, NEW JERSEY, ASSIGNOR TO RUBBER & CELLULOID PRODUCTS CO., OF NEWARK, NEW JERSEY, A CORPORATION OF NEW JERSEY

COLORED PLASTIC MATERIAL AND METHOD OF PRODUCING THE SAME

No Drawing.   Application filed February 27, 1931.   Serial No. 518,892.

This invention relates, generally, to colored plastic materials, and the invention has reference, more particularly, to a novel variegated colored plastic material and to the method of producing the same.

Heretofore, in producing plastic masses of variegated colored effects, it has been common to employ plastic bases such as the cellulosic plastics which are treated with suitable plasticizers, solvents and colors and are then subjected to a process of kneading and rolling, thereby producing plastics of differing colors. While these plastics are still soft and unseasoned, pieces are cut off of the same, thereby providing plastic pieces of various colors. These plastic pieces while thus soft are compressed into a solid mass by heat and pressure, from which mass, sheets, rods or tubes are cut. Or these plastic pieces, while soft, may be placed in an extruding machine and extruded, thereby producing rods, tubes or slabs. The articles thus produced may be of various color combinations, but the several colors are invariably streaked out into long irregular shapes. The processes for producing these articles are long and expensive and ofttimes necessitate the use of high grade bases, thereby greatly increasing the cost of manufacture.

The principal object of the present invention is to provide a novel and desirable variegated colored plastic material and a method for producing the same, whereby said material may be produced cheaply and easily from cheap stocks or scrap material, which plastic material possesses novel and attractive color configurations.

Another object of the present invention lies in the provision of a method for producing the novel variegated colored plastic material of this invention, by which method the several differently colored stocks or scrap materials are subjected to different degrees of softening, whereupon subsequent working of the masses causes the selected softer stock or stocks to serve as a matrix while the harder stock or stocks are changed but little in shape or maintain substantially their original shapes to produce thereby an article of novel design with the harder stocks forming, for example, approximately cubical configurations, and the softer stocks forming a matrix between such harder stocks.

Still another object of the present invention is to provide a novel variegated colored plastic material and a method of producing the same, whereby relatively cheap scrap material is treated with solvents or with solvents and plasticizers, a certain portion of said material being treated, preferably, with stronger solvents than the remainder, whereby said certain portion of the material is softened to a greater extent than the remaining portion, so that when the material is worked as under heat and pressure, a differential flow takes place between the portions of the material causing a novel variegated colored effect to be obtained.

Other objects of this invention not at this time more particularly enumerated, will be clearly understood from the following detailed description of the same.

Briefly stated, the preferred manner of carrying out the process of the present invention consists in using a plastic such as scrap pyroxylin plastic which may be obtained relatively cheaply, which scrap pyroxylin plastic is separated into groups of different colors, the scrap is then cut or chopped into fragmentary pieces of desired size, and one or more of these groups is treated with a relatively active solvent or solvent mixture while the remainder of these groups is treated with a less active solvent or solvent mixture, whereby a differential softening action is obtained. One or more of the groups may be treated with a plasticizer or plasticizers such as camphor, triphenyl phosphate, tricresyl phosphate or dibutyl phthalate. The group or groups of the material which is to serve as a matrix is thereby rendered quite soft, whereas the remaining groups are softened but little.

These groups after being mixed together are aged for a desired time until all the solvent has been absorbed by the material. The mass may now be worked as by placing the same in an extruding machine and extruded under heat and pressure to form various types of stock. By proper control of the types and quantities of solvents and plasticizers used, any desired differential softening of the several groups of fragments may be obtained, so that when the material is subsequently worked, the flowability of the different groups will vary in a predetermined manner to produce color configurations varying substantially from the cubical or other formation of the original particles to the long drawn out or flowing formation of a thoroughly digested matrix.

The preferred manner of carrying out the process of the present invention consists in using a plastic such as scrap pyroxylin plastic which may be obtained relatively cheaply, which scrap pyroxylin plastic is separated into groups according to consistency and color. The material of the several groups is then chopped up by use of suitable knives into fragmentary pieces of any desired size and shape depending upon the desired size and shape of the color configurations of the final product. For example, these pieces may be of a size approximating that of grains of corn. One or more of the groups of a certain color or colors is then selected to serve as a matrix to be made the most flowable of the lot. This selected group or groups is then transferred to a mixer and a sufficient quantity of a comparatively active solvent or solvent combination, such as ethyl acetate or acetone, or a solvent together with a plasticizer, such as a camphor-alcohol solution, is added to cause the material to become quite soft. After the solvent has been fairly well absorbed by the fragments, the remaining group or groups of the chopped scrap material is added, together with a somewhat weaker solvent, such as alcohol, and the mixing is continued.

After sufficient mixing and the solvent mixture or solvent-plasticizer mixture has been absorbed, the entire charge is transferred to air-tight containers and permitted to age, which aging period may vary from a few hours to a few days, during which period the solvents absorbed by the surface portions of the particles penetrate further into the same and exert the desired softening action. The extent of the softening action is controlled entirely by the selection or quantity of the solvent or solvents used.

In some instances, the selected group of particles of a certain color which is to form the matrix may be mixed individually and the other groups mixed separately from this matrix group, and then afterward the several groups are combined when the desired softening of all groups is obtained. Also, instead of using a stronger solvent for the group which is to serve as a matrix, a relatively weak solvent such as alcohol may be used for this group, in which case a larger quantity of alcohol is added to the group serving as a matrix and this solvent is allowed to act for a longer time so that the same will penetrate the matrix group sufficiently to cause the desired softening effect.

After the stock has been aged sufficiently in the air-tight container so that all solvents are absorbed by the stock, the mass is ready to be worked and may be transferred to an extruding machine where the same can be formed into tubes, rods, sheets or slabs by the application of heat and pressure.

It will thus be noted that after aging, there is obtained a mass of intermixed fragments of varying degrees of softness, which degrees of softness have been predetermined by the strength and quantity of solvent or plasticizer or both selected for use in the case of each group of fragments.

If some green stock as well as seasoned stock is used as a base material, the green stock will require less solvent to effect the desired softening action. If the green stock is to be used as a matrix and the remainder of the stock is seasoned, the entire quantity of stock including the green stock may be treated simultaneously with a single or plurality of solvents and/or plasticizers mixed together, whereupon the green matrix stock will become softer than the seasoned stock so that the desired increased flowability of the matrix stock is obtained over that of the remaining stock.

In order to predetermine accurately the relative softness of the several groups of stock when the same are subjected to heat and pressure, it is necessary that a knowledge of the latent solvent or plasticizer content of the respective groups be known. Thus, for example, stock having a high camphor content though relatively hard at ordinary temperatures, becomes quite soft and flowable under heat and pressure. If the camphor content of the several groups is not the same, then those groups having more camphor or other latent solvent or plasticizer than the remaining groups should be treated with a weaker or lesser amount of volatile solvent to obtain the same flowability under heat and pressure. Or, if desired, the deficiency in latent solvent, such as camphor, in certain of the groups of material may be made up by adding camphor or other plasticizers such as triphenyl phosphate, tricresyl phosphate or dibutyl phthalate to such groups at the time of treating the material with the volatile solvent so that the desired flowability under heat and pressure is obtained.

An illustrative method of producing one example of the novel variegated colored plastic material of this invention, wherein both volatile solvents and plasticizers or latent solvents are employed for effecting the desired softening action is given as follows:—

Fifty pounds of pyroxylin plastic of milk white colored stock, fifty pounds of blue colored pyroxylin plastic stock and fifty pounds of amber colored pyroxylin plastic stock were chopped up separately into fragmentary pieces of various shapes and sizes. These three stocks had substantially the same camphor content and it was decided to make the milk white stock serve as the matrix. A solution of eight pounds of alcohol and two and a half pounds of camphor was prepared, which solution was added to the milk colored stock fragments. This stock together with the solvent solution was placed in a mixer and the mixing operation was continued for a period of about a half-hour. A solution of six pounds of alcohol and four-tenths of a pound of camphor was added to the fifty pound blue colored stock fragments, and this mixture was also mixed independently in a mixer for a period of about a half hour. A solvent mixture of one pound of alcohol was added to the fifty pounds of the amber colored stock fragments and this mixture was also mixed independently in a mixer for about a half-hour. It will be noted that more alcohol and far more camphor were used in the mixing of the milk stock than were used in preparing the other stocks. In fact, the amber colored stock was not treated with any camphor at all.

Forty pounds of the milk colored stock mixture, ten pounds of the blue colored stock mixture and four pounds of the amber colored stock mixture were then intermixed together and transferred to an air-tight container and permitted to age for a couple of days. The mass was then removed from the container and placed in an extruding machine under heat and pressure. Since the milk colored stock had been treated with the greatest percentage of plasticizer or latent solvent as well as with the greatest percentage of volatile solvent, the same flowed readily under heat and pressure and formed a matrix for the remaining groups of material. The blue colored stock having some camphor in the same, flowed somewhat but not nearly so much as the milk colored stock. The amber colored stock fragments having no camphor and but little alcohol added thereto, flowed but little, so that these fragments were substantially unchanged in shape in the final product.

Thus, it will be apparent that by using varying amounts of volatile and non-volatile solvents or plasticizers, always taking into consideration the camphor or other latent solvent content of the scrap material used, it is readily possible to obtain an unlimited variety of variegated colored effects, varying from a mass made up of variously colored fragmentary pieces of substantially unchanged shape to a mass made up of certain highly flowable constituents along with other constituents which are not so flowable.

It is thus possible, by using the novel method of the present invention to obtain very simply and easily, many designs or colored configurations which were heretofore thought impossible to obtain, and even where certain of these configurations may have been obtained, they were only obtained at great expense.

By the novel method of this invention a number of different colored effects can be cheaply produced, which effects may range from an even homogeneous color to one where a portion of certain colored fragments have their original shapes substantially unchanged, the same being occluded in a matrix of more readily flowable material during the extrusion operation. It will be noted that the novel colored effects are brought about entirely by the variation in the flowability of the different colored stocks, which in turn is caused by the variation in the solvent activity and contents of one or more or each of them.

It will be apparent that by using solvent mixtures consisting of volatile solvents and/or plasticizers of reduced activities on mixtures comprising chopped pieces of differently colored and differently aged reclaimed plastics, a selective solvent action will take place, whereby certain of the color pieces become very much softer than the others. By proper control of the solvents and the blended plastic mixtures, conditions can be brought about to cause differential flows during extrusion. Thus, it is possible to use a blended mixture of pyroxylin plastic fragments in a mixer charge and add a comparatively weak solvent or a smaller amount of a stronger solvent so that the solvent action on the various stocks will be selective.

It will be apparent in practice that the relative proportions of volatile or latent solvents used may be varied within rather wide limits and still come within the purview of this invention.

It is desired to point out that the method of the present invention is applicable not only to pyroxylin plastics but is equally applicable to the other plastics, such as cellulose acetate plastics, ethyl cellulose plastics, benzyl cellulose plastics, viscose, cellulosic plastics in general implying the whole group, casein plastics, rubber plastics, synthetic resin plastics, and the like, including mixtures of two or more of such plastics.

It is intended that the terms solvent or solvent mixture used in the following claims shall be construed as meaning volatile solvents and/or plasticizers or latent solvents.

What is claimed is:—

1. A process for producing a variegated colored cellulosic plastic material from a plurality of cellulosic plastic masses of different colors, comprising cutting the plastic masses into small portions, treating certain of said portions with a relatively active solvent mixture and the remainder of said portions with a less active solvent mixture, whereby said certain portions are rendered relatively soft when subjected to heat and pressure, whereas the remainder of said portions are rendered less soft when subjected to heat and pressure, and then working said combined portions under heat and pressure into desired articles, wherein said softer portions serve as a matrix.

2. A step in the process of producing a variegated colored cellulosic plastic material from a plurality of cellulosic plastic masses, consisting of differentially softening said plastic masses by solvent means, whereby a differential flowability of said treated masses is obtained.

3. A process for producing a variegated colored cellulosic plastic material from a plurality of cellulosic plastic masses of differing colors, comprising cutting said plastic masses into small portions, treating said various portions according to their color with various amounts of solvent so that said portions are rendered semi-soft, some of the portions being rendered more flowable than the rest, aging said portions so that the solvent will adequately penetrate the same, and then working said portions into desired shape, during which working operation a differential flow of the differently colored portions takes place.

4. A process for producing a variegated colored cellulosic plastic material from a plurality of cellulosic plastic masses of differing colors, comprising cutting said masses into small fragments, selecting certain fragments to serve as a matrix, adding a predetermined proportion of solvent and mixing the fragments and solvent in a mixer so as to cause the fragments to become quite soft, placing the remainder of the fragments in a mixer together with a predetermined lesser proportion of solvent and mixing until the solvent has been substantially absorbed by the fragments, combining the fragment masses and transferring the combined mass of fragments to a container for aging, during which aging period the solvents penetrate deeper into the interior of the fragments, and then transferring the mass to an extruding machine and extruding the same, during which extruding operation a differential flow of the several differently colored fragments takes place.

5. A process for producing a variegated colored cellulosic plastic material from a plurality of cellulosic plastic masses of differing colors, comprising cutting said masses into small fragments, selecting the fragments of a certain color and placing the same in a mixer, adding a sufficient quantity of comparatively active solvent and mixing the fragments and solvent so as to cause the fragments to become quite soft, placing the remainder of the fragments in the mixer together with a quantity of somewhat weaker solvent and continuing the mixing until the solvents have been substantially absorbed by the fragments, transferring the combined mass of fragments to an air-tight container for aging, during which aging period the solvents penetrate deeper into the interior of the fragments, and then transferring the mass to an extruding machine and extruding the same under heat and pressure, during which extruding operation a differential flow of the several fragments takes place, the initially treated and softer fragments serving as a matrix for the subsequently treated harder fragments.

In testimony that I claim the invention set forth above I have hereunto set my hand this 21st day of February, 1931.

ANDREW ALBRIGHT, 3d.